United States Patent
Song et al.

(10) Patent No.: US 10,061,048 B2
(45) Date of Patent: Aug. 28, 2018

(54) METHOD OF ANALYZING FORMATION SAMPLES USING NMR MEASUREMENTS WITH AN ECHO TIME BEING 100 MICROSECONDS OR LESS

(71) Applicant: SCHLUMBERGER TECHNOLOGY CORPORATION, Sugar Land, TX (US)

(72) Inventors: Yi-Qiao Song, Newton Center, MA (US); Albina Rishatovna Mutina, Maturin (VE); Ravinath Kausik Kadayam Viswanathan, Boston, MA (US); Martin Hurlimann, Newton, MA (US)

(73) Assignee: SCHLUMBERGER TECHNOLOGY CORPORATION, Sugarland, TX (US)

( * ) Notice: Subject to any disclaimer, the term of this patent is extended or adjusted under 35 U.S.C. 154(b) by 946 days.

(21) Appl. No.: 14/334,461

(22) Filed: Jul. 17, 2014

(65) Prior Publication Data

US 2015/0022202 A1 Jan. 22, 2015

Related U.S. Application Data

(60) Provisional application No. 61/847,263, filed on Jul. 17, 2013.

(51) Int. Cl.
*G01V 3/14* (2006.01)
*G01V 3/38* (2006.01)

(52) U.S. Cl.
CPC . *G01V 3/14* (2013.01); *G01V 3/38* (2013.01)

(58) Field of Classification Search
USPC .......................... 324/300–322; 600/407–435
See application file for complete search history.

(56) References Cited

U.S. PATENT DOCUMENTS

| | | | | |
|---|---|---|---|---|
| 6,005,389 A | * | 12/1999 | Prammer | G01N 24/081 324/300 |
| 8,004,279 B2 | * | 8/2011 | Kruspe | G01V 3/32 324/303 |
| 8,723,517 B2 | * | 5/2014 | Takahashi | G01R 33/4816 324/307 |

(Continued)

FOREIGN PATENT DOCUMENTS

WO 2013148516 A1 10/2013

OTHER PUBLICATIONS

Burcaw, et al., "Improved Methods for Estimating the Viscosity of Heavy Oils from Magnetic Resonance Data", SPWLA 49th Annual Logging Symposium, Edinburgh, Scotland, May 25-28, 2008, pp. 1-14.

(Continued)

*Primary Examiner* — Melissa Koval
*Assistant Examiner* — Tiffany Fetzner

(57) ABSTRACT

Methods for analyzing a formation samples using nuclear magnetic resonance (NMR) are described herein. One method includes performing an NMR measurement of the formation sample to obtain NMR data. The NMR measurement detects NMR signals with echo times of less than or equal to 100 microseconds. The NMR data is analyzed to determine a measure of organic hydrogen content of the formation sample, such as (i) total organic hydrogen content, (ii) kerogen content, (iii) bitumen content, and/or (iv) oil content.

10 Claims, 6 Drawing Sheets

(56) References Cited

U.S. PATENT DOCUMENTS

| | | | | |
|---|---|---|---|---|
| 9,018,950 | B2* | 4/2015 | Li | G01N 24/081 324/309 |
| 9,547,058 | B2* | 1/2017 | Miyazaki | G01R 33/50 |
| 9,562,959 | B2* | 2/2017 | Miyazaki | G01R 33/5605 |
| 2009/0292473 | A1* | 11/2009 | Kruspe | G01V 3/32 702/8 |
| 2011/0204892 | A1* | 8/2011 | Li | G01N 24/081 324/309 |
| 2013/0176026 | A1* | 7/2013 | Song | G01N 24/081 324/309 |
| 2014/0062473 | A1* | 3/2014 | Miyazaki | G01R 33/50 324/308 |
| 2014/0062476 | A1* | 3/2014 | Miyazaki | G01R 33/341 324/309 |
| 2014/0333304 | A1* | 11/2014 | Jensen | G01N 24/085 324/309 |
| 2014/0361774 | A1* | 12/2014 | Jensen | G01N 24/08 324/309 |
| 2015/0022202 | A1* | 1/2015 | Song | G01V 3/38 324/307 |
| 2015/0177351 | A1* | 6/2015 | Venkataramanan | G01V 3/14 324/309 |

OTHER PUBLICATIONS

Freed, "Dependence on chain length of NMR relaxation times in mixtures of alkanes", Journal of Chemical Physics, vol. 126, No. 17, 2007, 10 pages.

Freed, et al., "Scaling Laws for Diffusion Coefficients in Mixtures of Alkanes", Physical Review Letters, vol. 9, No. 6, Feb. 17, 2005, 4 pages.

Frey, et al., "Phosphorus-31 MRI of hard and soft solids using quadratic echo line-narrowing", Proceedings of the National Academy of Sciences of the United States of America, vol. 109, No. 14, Jan. 28, 2012, 6 pages.

Fukushima, et al., "Experimental Pulse NMR: A Nuts and Bolts Approach", Westview Press, 1981, pp. 251-255.

Hirasaki, et al., "NMR properties of petroleum reservoir fluids", Magnetic Resonance Imaging, vol. 21, 2003, pp. 269-277.

Hurlimann, et al., "Hydrocarbon Composition From NMR Diffusion and Relaxation Data", Petrophysics, vol. 50, No. 2, 2009, pp. 116-129.

Yang, et al., "NMR measurement of bitumen at different temperatures", Journal of Magnetic Resonance, vol. 192, No. 2, Jun. 2008, pp. 280-293.

* cited by examiner

METHOD OF ANALYZING FORMATION SAMPLES USING NMR MEASUREMENTS WITH AN ECHO TIME BEING 100 MICROSECONDS OR LESS

PRIORITY

The present application claims the benefit of U.S. Application Ser. No. 61/847,263 filed Jul. 17, 2013, which application is incorporated herein, in its entirety, by reference.

TECHNICAL FIELD

This disclosure relates to analyzing formation samples. In particular, this disclosure relates to analyzing formation samples using nuclear magnetic resonance (NMR) measurements.

BACKGROUND

Nuclear magnetic resonance (NMR) can be used to determine properties of a substance. An NMR measurement includes applying a static magnetic field to the substance. The static magnetic field generates an initial magnetization of atomic nuclei within the substance. Then, an oscillating magnetic field is applied at a particular frequency to the substance. The oscillating field is composed of a sequence of radio frequency (RF) pulses that tip the magnetization of the atomic nuclei away from the initial magnetization. The sequence of pulses can be arranged so that the pulses and the static field interact with the nuclei to produce a NMR signal composed of "echoes" within at least a portion of the substance. The NMR signal is detected and can be used to determine properties of the substance.

In the oilfield industry, NMR measurements are one of the main petrophysical tools for formation evaluation. In addition to evaluating formation porosity, NMR measurements can be used to identify fluids and to determine fluid mobility within confining reservoir rock geometries. More specifically, NMR response of the fluid in the reservoir rock carries information about (i) fluid properties, such as viscosity, composition, (ii) characteristics of the confining geometries, such as pore size distribution, tortuosity, and permeability, and (iii) fluid-rock interaction, such as wettability.

NMR has a long history of successful deployment in conventional reservoirs. However, the ability to produce unconventional reservoirs, such as shale oil and shale gas formations, has resulted in re-assessment of logging methods and data interpretation. New parameters that are used for log interpretation of unconventional reservoirs include kerogen content, bitumen, content, oil content, gas content, and total organic content (TOC). The new parameters also include the state/location of hydrocarbons in the complex geometries of pore space within reservoir rock, which includes oil-wet organic matter porosity and water or mix-wet inter/intra-granular porosity. In conventional reservoirs, the amount of bitumen and kerogen are typically very small, whereas, in unconventional reservoirs, porosity is low (e.g., 5%) and the relative amount of kerogen and bitumen is much greater. The content of these kerogen and bitumen constituents is indicative of reservoir maturity. Furthermore, TOC is highly correlated with the producibility of a shale reservoir and, because of this correlation, TOC is a valuable measure in the evaluation of unconventional reservoirs.

Conventional oilfield NMR techniques are not able to determine many of these new parameters because unconventional reservoirs, such as shale formations, have short T2 relaxation times. For example, shale formations are characterized by T2 relaxation times below 0.03 seconds. Conventional oil field NMR techniques do not detect T2 relaxation times below 0.03 seconds. Thus, conventional techniques do not provide for efficient and accurate characterization of parameters, such as kerogen content, bitumen content, and TOC.

SUMMARY

Illustrative embodiments of the present disclosure are directed to methods for analyzing a formation sample using nuclear magnetic resonance (NMR). In one embodiment, the method includes performing an NMR measurement of the formation sample to obtain NMR data. The NMR measurement detects NMR signals with echo times of less than or equal to 100 microseconds. The NMR data is analyzed to determine a measure of organic hydrogen content of the formation sample.

In another embodiment, the method includes performing an NMR measurement of the formation sample to obtain NMR data. The NMR measurement detects NMR signals with echo times of less than or equal to 100 microseconds. The NMR data is analyzed to determine kerogen content of the formation sample.

In yet another embodiment, the method includes performing an NMR measurement of the formation sample to obtain NMR data. A T2 relaxation time spectrum is determined using the NMR data. The method further includes determining a number of measures of organic hydrogen content using the T2 relaxation time spectrum and a number of T2 relaxation time boundary values. The measures of organic hydrogen content can be (i) kerogen content, (ii) bitumen content, and/or (iii) oil content.

BRIEF DESCRIPTION OF THE DRAWINGS

Those skilled in the art should more fully appreciate advantages of various embodiments of the disclosure from the following "Description of Illustrative Embodiments," discussed with reference to the drawings summarized immediately below.

DESCRIPTION OF ILLUSTRATIVE EMBODIMENTS

Illustrative embodiments of the present disclosure are directed to methods of analyzing a formation sample using nuclear magnetic resonance (NMR). One such method includes performing an NMR measurement of the formation sample to obtain NMR data. The method is performed using an NMR system that can detect NMR signals with echo times of less than or equal to 100 microseconds, such as a high-field NMR system. The method further includes analyzing the NMR data to determine a measure of organic hydrogen content of the formation sample. In various embodiments, the method can measure and distinguish between various measures of organic hydrogen content, such as total hydrogen organic hydrogen content, bitumen content, kerogen content, and oil content, whereas conventional oilfield NMR techniques are not able to measure such parameters. Details of various embodiments are discussed below.

Figure 1:
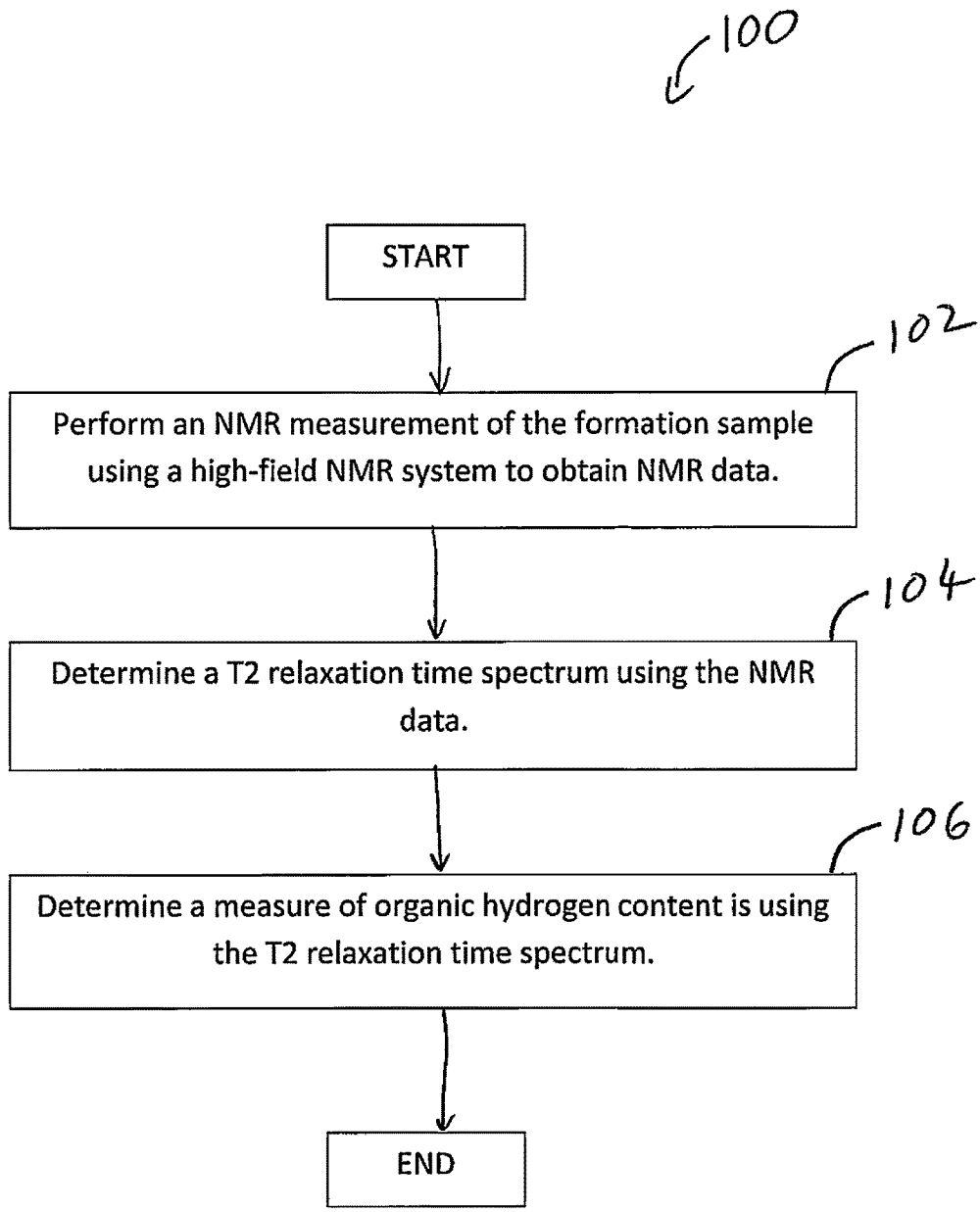
FIG. 1 shows a method of analyzing a formation sample using nuclear magnetic resonance (NMR) in accordance with one embodiment of the present disclosure.

FIG. 1 shows a method 100 for analyzing a formation sample using NMR measurements. At process 102, an NMR measurement of the formation sample is performed to obtain NMR data. The NMR measurement is performed using a high-field NMR system. The NMR system applies a static magnetic field to the formation sample. Then, the NMR system applies a series of radio frequency pulses to the formation sample ("a pulse sequence"). In some embodiments, the static magnetic field applied to the formation sample is at least 0.2 Tesla, which generates associated Larmor frequencies of at least 8 MHz. The pulse sequences generate NMR signals within the formation sample and the NMR system detects the NMR signals between or after the radio frequency pulses.

The high-field NMR system detects NMR signals with echo times of less than or equal to 100 microseconds. In further embodiments, the high-field NMR system detects NMR signals with echo times of less than or equal to 60 microseconds. Also, is some embodiments, the NMR system has a dead time of less than or equal to 20 microseconds. The "dead time" is the time interval defined by (i) the end of a radio frequency pulse and (ii) the time when the NMR system detects NMR signals. By detecting short echo times and using short dead times, the NMR system is able detect a broader range of NMR signals from the hydrocarbons present in the sample. In particular, the NMR system is able to measure short T2 relaxation times that are associated with more solid or solid-like constituent components of the formation sample, such as kerogen and bitumen. Such high-field NMR systems are available from Bruker Biospin of Billerica, Mass., Agilent Technologies of Santa Clara, Calif., and Magritek of Wellington New Zealand.

Figure 2:
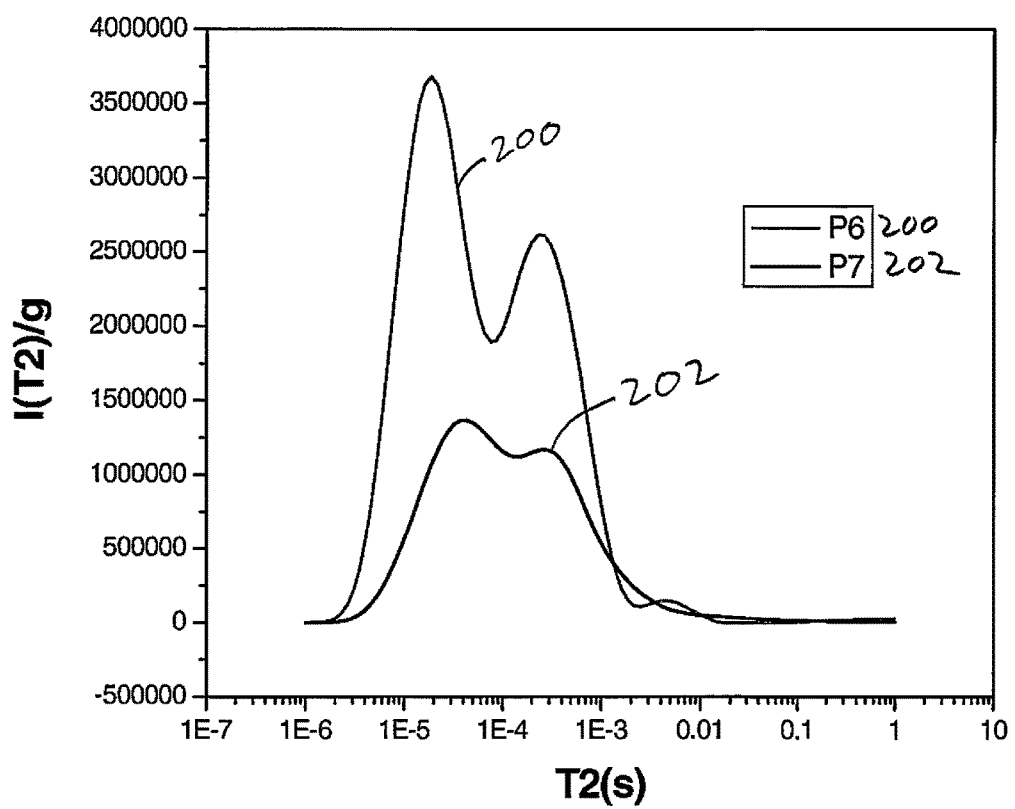
FIG. 2 shows a T2 relaxation time spectrum for a shale formation sample ("P6") and a T2 relaxation time spectrum for another shale formation sample ("P7") in accordance with various embodiments of the present disclosure.

Once the NMR data is obtained, in process 104, a T2 relaxation time spectrum is determined using the NMR data. In various embodiments, the T2 spectrum extends from 10 microseconds to 1 second. FIGS. 2-5 show examples of T2 relaxation time spectrums. The spectrums include amplitude versus T2 relaxation time. The NMR data for these figures were obtained using a 400 MHz NMR system (in magnetic field units this is 9.4 Tesla). FIG. 2 shows a T2 relaxation time spectrum for a shale formation sample ("P6") 200 and a T2 relaxation time spectrum for another shale formation sample ("P7") 202. The spectra 200 and 202 each show two peak distributions. The shorter T2 signal peaks at about 20-100 microseconds, and the other at about 300 microseconds. No signal at much longer T2 relaxation times indicates the lack of light hydrocarbons.

At process 106, a measure of organic hydrogen content is determined using the T2 relaxation time spectrum. In one embodiment, the measure of organic hydrogen content can be the total organic hydrogen content for the formation sample. If other non-organic hydrogen constituents (e.g., water) are excluded, this measure corresponds with the total organic content (TOC) within the formation sample. By detecting a broader range of NMR signals from the formation sample, as described herein, the method can more accurately determine the total organic hydrogen content for the formation sample. In another embodiment, the measure of organic hydrogen content is determined using the T2 relaxation time spectrum and a set of T2 relaxation time boundary values (e.g., one or more T2 relaxation time boundary values). In this embodiment the measure of organic hydrogen content can be an individual fraction for hydrocarbons, such as (i) kerogen, (ii) bitumen, and/or (iii) oil. Each of these hydrocarbon components of the formation sample produces signals with particular T2 relaxation times. To quantify the content of each component, the set of T2 relaxation time boundary values for each component can be used to determine the content of each component. In particular, the content of each component can be determined by integrating a portion of the spectrum defined by the set of T2 relaxation time boundary values. Table 1 below shows an example of T2 relaxation time boundary values for several hydrocarbon components.

TABLE 1

| Constituent Component | T2 Relaxation Time Boundary Values |
|---|---|
| Kerogen | Less than 100 microseconds (e.g., 1 to 100 microseconds). |
| Bitumen | Between 100 and 1000 microseconds. |
| Heavy Oil | Between 500 and 5000 microseconds (e.g., 1000 to 5000 microseconds). |
| Light Oil | Between 5000 microseconds to 1 second. |

Figure 3:
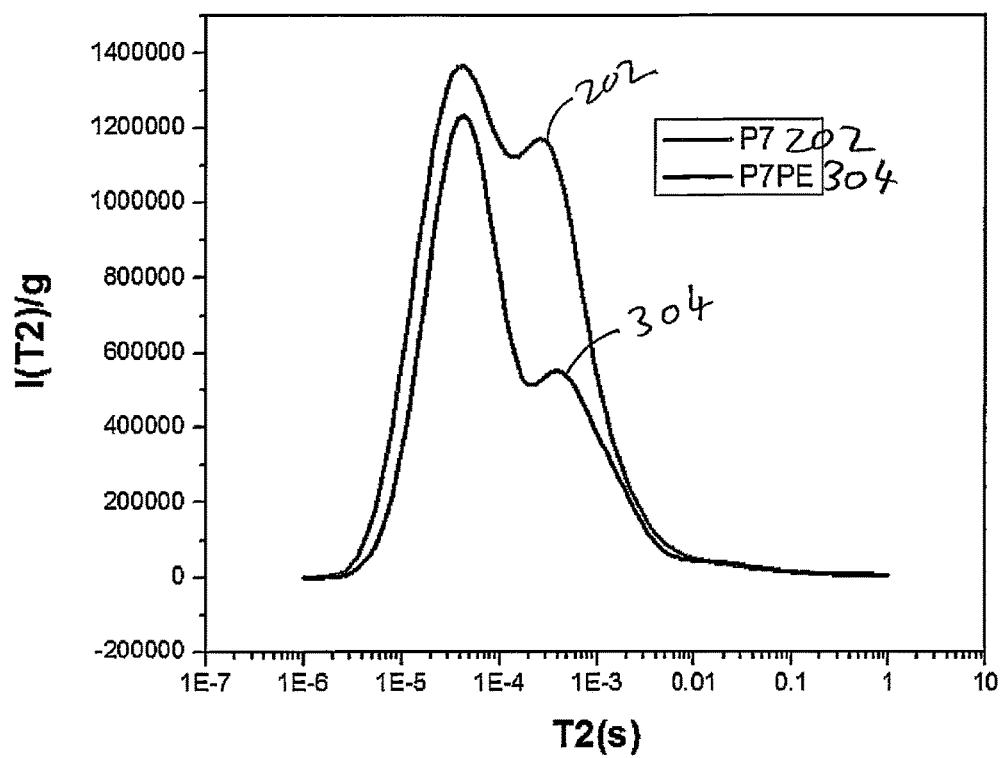
FIG. 3 shows the T2 relaxation spectra for the P7 formation sample obtained before and after the sample was treated in toluene for several days to extract bitumen, in accordance with various embodiments of the present disclosure.

Table 1 indicates that the peak in FIG. 2 for the P7 formation sample 202 is bitumen. This conclusion can be confirmed by processing the sample to remove a portion of the bitumen and performing another NMR analysis. FIG. 3 shows the T2 spectrum of the P7 formation sample obtained before (202) and after (304) the sample was treated in toluene for several days to extract bitumen. The figure shows that the longer T2 peak (300 microseconds) is greatly reduced, which indicates that the bitumen signal is from the 300 microsecond peak in the original T2 spectrum. Similar processing can be done to confirm the presence or absence of other constituent components within the sample.

In another embodiment, the set of T2 relaxation time boundary values are determined empirically for a particular well site, oil field, and/or geological formation. The set of T2 relaxation time boundary values can be determined by removing constituent components from the formation sample to better identify the values for the components. For example, a formation sample can be separated into a number of constituent components. The components can be mineral components and hydrocarbon components, such as a kerogen component, a bitumen, component, and/or a heavy oil component. The components are extracted from the formation sample using solvent extraction techniques, demineralization techniques, or other techniques know in the art of shale characterization. Next, an NMR measurement is performed for each of the constituent components of the formation sample to obtain NMR data. This NMR data is used to determine a T2 relaxation time spectrum for each of the constituent components. The NMR measurement is performed using a high-field NMR system so that the measurements will reflect a broad T2 spectrum that includes relaxation times of 10 microseconds (or less). The T2 relaxation time boundary values for each constituent component can be determined within the T2 relaxation time spectrum for each respective component. The T2 relaxation time boundary values are determined by identifying boundaries of a peak within each spectrum. These T2 relaxation time boundary values can be used to analyze other formation samples and future samples taken from a particular well site, oil field, and/or geological formation.

Figure 4:
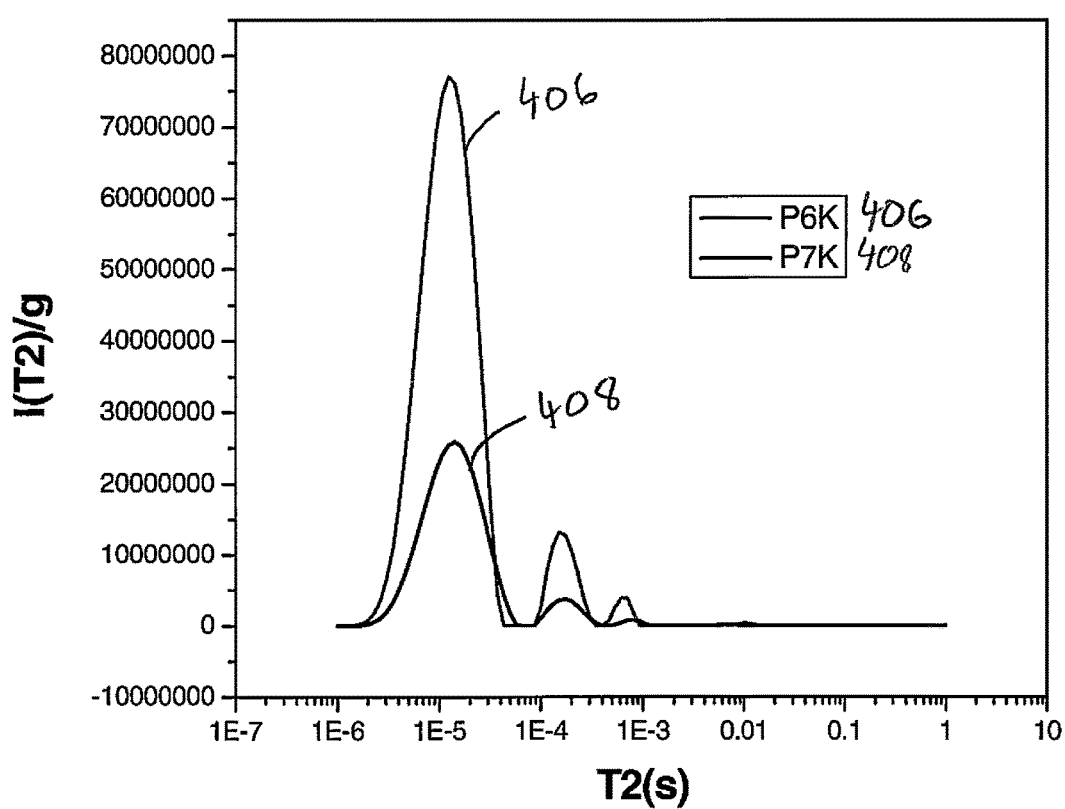
FIG. 4 shows spectra obtained from the P6 and P7 formation samples that underwent further processing to isolate kerogen within the samples in accordance with various embodiments of the present disclosure.

FIG. 4 shows spectra obtained from the P6 (406) and P7 (408) formation samples that underwent further processing to isolate kerogen within the samples. The P6 and P7 formation samples were processed to remove minerals (e.g., sands) and bitumen from the samples. FIG. 4 shows the resulting T2 relaxation time spectra for the isolated kerogen in the P6 and P7 samples and, in particular, an associated T2 peak for kerogen within a range of short T2 relaxation times between 10 and 30 microseconds. Thus, T2 relaxation time boundary values between 10 and 30 microseconds can be used to identify and quantify kerogen in the P6 and P7 formation samples, as well as other formation samples.

Figure 5:
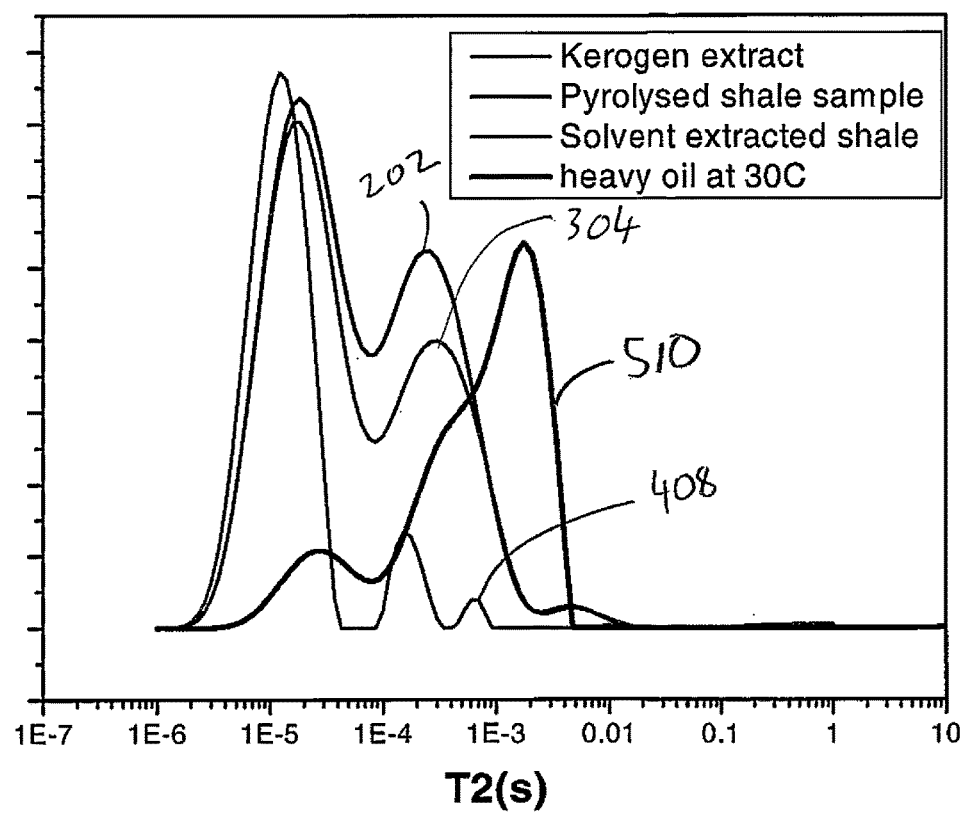
FIG. 5 shows a composite of spectra for the P6 formation sample.

FIG. 5 shows a composite of spectra for the P7 formation sample. The figure includes the T2 spectrums for the initial shale sample (202), bitumen extracted sample (304), the isolated kerogen sample (408), and a heavy oil sample at 30° C. (510).

A number of different NMR pulse sequences can be used to analyze the formation samples. In various embodiments, the pulses sequences have short radio frequency pulses of 1 microsecond (or less) and short echo spacing of 5 microseconds (or less). The short pulse parameters facilitate detection of short T2 relaxation times. In various embodiments, the NMR measurement uses a Carr Purcell Meiboom Gill (CPMG) pulse sequence, a Free Induction Decay (FID) pulse sequence, or both. In some embodiments, NMR measurements are performed using both the CPMG sequence and the FID sequence. NMR data obtained from each of the sequences is used together to determine the T2 relaxation spectrum for the sample. CPMG sequences accurately measure long T2 relaxation times, but are not as effective for measuring short relation times. In contrast, FID pulse sequences more accurately measure short T2 relaxation times. Thus, a T2 relaxation spectrum can be generated by using the short T2 relaxation times measured by the FID sequence and the longer T2 relaxation times measured by the CPMG sequence.

Various other NMR pulse sequences can also be used. For example, a solid echo pulse sequence can be used to characterize substances with very short T2 relaxation times. A solid echo pulse sequence uses two 90 degree pulses to produce an echo. In comparison, a spin echo uses a 90 degree pulse followed by a 180 degree pulse. Further details of solid echo pulse sequences are provided in Eiichi Fukushima and Stephen B. W. Roeder, Experimental Pulse NMR: A Nuts and Bolts Approach, pp. 251-255 (1981).

Figure 6:
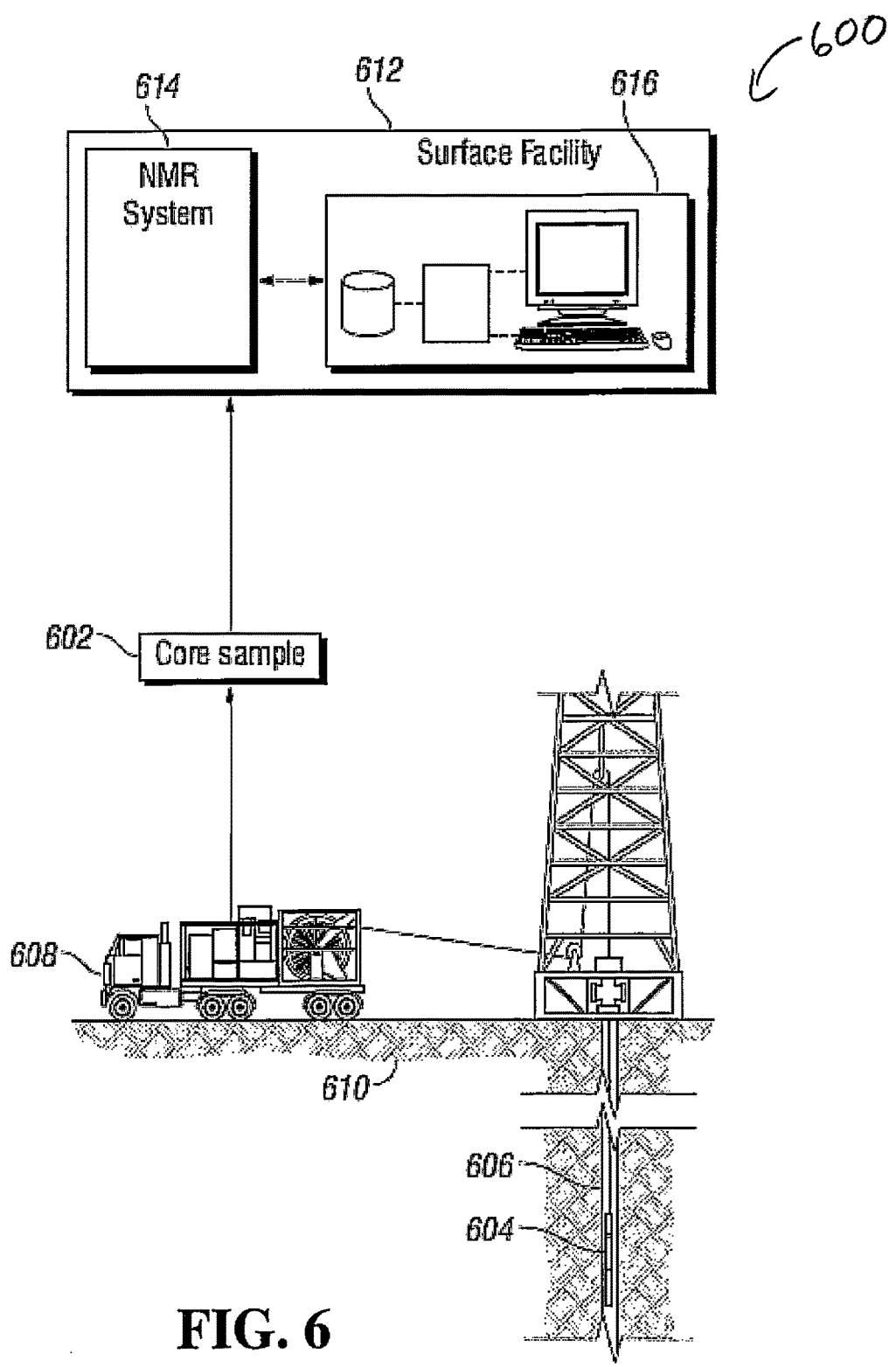
FIG. 6 shows (i) a wireline tool string that is deployed in a well and (ii) a surface location for analyzing formation samples obtained by the tool string in accordance with one embodiment of the present disclosure.

In various embodiments, before the method of FIG. 1 begins, the formation sample is retrieved from the formation. In one embodiment, the formation sample is a core sample that is retrieved from the formation using a wireline tool string. FIG. 6 shows a wireline tool string 604 that is deployed in a well 606 via a wireline truck 608. The wireline tool 604 is a downhole tool is configured to remove a core sample 602 from a formation 610 using, for example, a coring device. In another embodiment, the formation sample is a cuttings sample. Cuttings samples are pieces of formation that are cut away from the formation by a drill bit during a drilling operation and are retrieved from drilling mud that circulates to the surface. This disclosure is not limited to analysis of any particular type or form of formation sample. Any other type or form of formation sample can be analyzed.

Once the sample 602 is obtained, the sample is transported to a surface facility 612, which includes an NMR system 614 and an operator module 616 for carrying out the NMR analysis described herein, as well as additional processing. The additional processing may include using a solvent to remove drilling mud contamination (e.g. water-based mud contamination or oil-based mud contamination) or one of the constituent hydrocarbon components from the sample 602 (e.g., kerogen, bitumen, and/or heavy oil). The additional processing may also include drying the sample 602 to remove water from the sample. The hydrogen nuclei within water will be detected by an NMR measurement. Accordingly, water is removed from the sample 602 so that the NMR system can obtain a more accurate measure of organic hydrogen content.

In various embodiments, the surface facility 612 is located at the well 606, such as in a truck or a cabin. In other embodiments, the surface facility 612 is located in a location remote from the well 606, such as in a laboratory. The operator module 616 includes a processing system that supports a graphical user interface (GUI), such as a monitor, a touch screen, a mouse, a keyboard and/or a joystick. The GUI allows an operator to control and communicate with the NMR system 614. The NMR system is a high-field NMR system with some or all of the characteristics described above. For example, the NMR system can detect NMR signals with echo times of less than or equal to 100 microseconds The NMR system 614 is used to perform a NMR measurement on the formation sample and to obtain NMR data. This NMR data is communicated to the processing system. The processing system uses the NMR data to generate a T2 relaxation time spectrum and to determine a measure of organic hydrogen content using the spectrum.

In some embodiments, a formation sample from a shale formation is analyzed. Shale formations are composed of fine-grained sedimentary rock. Some shale formations are rich in organic material and may be source rock for hydrocarbon reservoirs. In some cases, the shale formations also contain oil and gas. Shale formations are characterized by the presence of small pores in an organic fraction of the formation, in addition to porosity in an inorganic fraction of the formation. The porosity and the permeability of shale formations are often low with values typically less than 10 pu and 1 uD, respectively. The organic fraction of the shale formation includes solid kerogen, highly viscous bitumen, and possibly lighter hydrocarbons (e.g., oil and/or gas). Kerogen is the fraction of organic matter that is insoluble in organic solvents, whereas bitumen is soluble in organic solvents. As explained above, the quantities of kerogen and bitumen in the shale formation reflect the shale maturity and also have a role to play in hydrocarbon recovery from the shale formation.

Various embodiments of the NMR measurements described herein have a number of advantages over other techniques. NMR measurements can be non-destructive and lithology independent. NMR measurements are bulk measurements and the measured amplitude of the NMR signal is directly proportional to the number of protons in the formation sample. This is in contrast to many other spectroscopic techniques, such as diffuse reflectance infrared fourier transform spectroscopy (DRIFTS). The sample preparation for the NMR analysis can be minimal and it is possible to perform the measurements on cores or on cuttings. The measurement time can be less than a few minutes, possibly as short as a few seconds. Relaxation measurements do not require highly homogeneous magnetic fields. It is therefore possible to perform such measurements in mobile NMR systems using permanent magnets that can be brought to the well site.

The term "processing system" should not be construed to limit the embodiments disclosed herein to any particular device type or system. The processing system may be a laptop computer, a desktop computer, or a mainframe computer. The processing system may also include a processor (e.g., a microprocessor, microcontroller, digital signal processor, or general purpose computer) for executing any of the methods and processes described above (e.g. processes 104 and 106 in FIG. 1). The processing system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, NMR pulse sequences, obtained NMR data, T2 relaxation time spectra, T2 relaxation time boundary values, and/or measures of organic hydrogen content, as described above.

Any of the methods and processes described above (e.g. processes 104 and 106 in FIG. 1) can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

The invention claimed is:

1. A method of analyzing a formation sample in order to identify fluids and determine fluid mobility within confining reservoir rock geometries using a nuclear magnetic resonance (NMR) system the method comprising:
    retrieving the formation sample from a formation using a borehole tool or a drill bit;
    performing an NMR measurement pulse sequence on the formation sample, with the NMR system in order to obtain NMR data, wherein detected NMR signals have echo times of less than or equal to 100 microseconds and the NMR system has a dead time of less than or equal to 20 microseconds;
    determining a T2 relaxation time spectrum from the obtained NMR data, by utilizing a processing system of the NMR system; and
    analyzing the obtained NMR data with the processing system in order to determine a plurality of measures of organic hydrogen content from the formation sample where at least one of the measures in the plurality of measures of organic hydrogen content is an amount of kerogen content in the formation sample, along with, at least one of the following:
    a) an amount of bitumen content in the formation,
    b) an amount of oil content in the formation, wherein oil content includes heavy oil, light oil, or the amount of oil as a whole without distinguishing between heavy oil and light oil,
    c) an amount of heavy oil in the formation,
    d) an amount of light oil in the formation, and
    e) an amount of total organic content (TOC) by utilizing the determined T2 relaxation time spectrum in combination with at least one T2 relaxation time boundary value, wherein each of the at least one T2 relaxation time boundary value(s) is/are determined by:
        (i) separating the retrieved formation sample into a plurality of constituent components comprising kerogen, and at least one of bitumen, heavy oil, light oil, or oil itself without distinguishing between heavy oil and light oil, based on the determined T2 relaxation times of the T2 relaxation time spectrum;
        (ii) performing an NMR measurement pulse sequence with respect to each of the plurality of constituent components in step (i) in order to obtain the NMR data;
        (iii) determining a T2 relaxation time spectrum with respect to each of the plurality of constituent components in step (i) from the obtained NMR data of step (ii); and
        (iv) identifying at least one T2 relaxation time boundary value with respect to each of the plurality of constituent components in step (i) by utilizing the determined T2 relaxation time spectrum of step (iii); and
    providing the identified at least one T2 relaxation time boundary value(s) along with the analyzed plurality of measures of organic hydrogen content, which includes the measured amount of kerogen content, either to a user, or a memory or a display, of the NNR system as an output of the analysis performed by the processing system, of the NMR system.

2. The method of claim 1, wherein performing the NMR measurement of the formation sample comprises: applying a Carr Purcell Meiboom Gill (CPMG) pulse sequence to the formation sample with the NMR system in order to obtain the NMR data.

3. The method of claim 2, wherein performing the NMR measurement of the formation sample comprises: applying a Free Induction Decay (FID) pulse sequence to the formation sample with the NMR system in order to obtain the NMR data.

4. The method of claim 3, wherein the T2 relaxation time spectrum is determined from the NMR data obtained from both the CPMG pulse sequence and the FID pulse sequence.

5. The method of claim 1, wherein performing the NMR measurement of the formation sample comprises: applying a solid echo pulse sequence to the formation sample with the NMR system in order to obtain the NMR data.

6. The method of claim 1, wherein the NMR measurement pulse sequence detects NMR signals with echo times of less than or equal to 60 microseconds.

7. The method of claim 1, wherein performing the NMR measurement pulse sequence on the formation sample also comprises: applying a static magnetic field of at least 0.2

Tesla with the static magnetic field producing components that are part of NMR system.

8. The method of claim 1, wherein the formation sample retrieved is at least one of a core sample and a cutting sample.

9. The method of claim 1, wherein the formation sample retrieved is a shale formation sample.

10. The method of claim 1, further comprising:
- analyzing the NMR data in order to determine a bitumen content of the formation sample, in addition to the kerogen content of the sample when measuring and analyzing the plurality of measures of the organic hydrogen content.

\* \* \* \* \*